US007192131B2

(12) United States Patent
Gao et al.

(10) Patent No.: US 7,192,131 B2
(45) Date of Patent: Mar. 20, 2007

(54) FILTER ELEMENT CARRIER, FILTER, INK PEN

(75) Inventors: Jinsong Gao, San Diego, CA (US); M. Derek Patton, San Diego, CA (US); Blair A. Butler, San Diego, CA (US); Jorge Angel Borquez, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 300 days.

(21) Appl. No.: 10/843,913

(22) Filed: May 12, 2004

(65) Prior Publication Data

US 2005/0253910 A1 Nov. 17, 2005

(51) Int. Cl.
*B41J 2/175* (2006.01)
*B01D 29/00* (2006.01)

(52) U.S. Cl. ........................................ 347/93; 210/453

(58) Field of Classification Search .................. 347/85, 347/86, 87, 92, 93; 210/234, 453, 455, 184, 210/185, 231

See application file for complete search history.

(56) References Cited

U.S. PATENT DOCUMENTS 4,793,712 A 12/1988 Kostecki
4,947,191 A * 8/1990 Nozawa et al. ............... 347/30
5,151,180 A 9/1992 Giordano
5,256,285 A * 10/1993 Tomita et al. ............. 210/234
5,296,875 A 3/1994 Suda
5,489,930 A * 2/1996 Anderson .................... 347/71
5,538,632 A 7/1996 Gero
5,546,109 A * 8/1996 Nakano ....................... 347/93
6,120,140 A * 9/2000 Hirosawa et al. ............. 347/93
6,158,855 A * 12/2000 Saikawa ...................... 347/93
6,180,002 B1 * 1/2001 Higgins ...................... 210/185
6,217,164 B1 * 4/2001 Hino ........................... 347/85
6,635,179 B1 10/2003 Summerton
6,652,083 B2 11/2003 Ison et al.

FOREIGN PATENT DOCUMENTS

DE 42 35 347 4/1994
DE 299 10 958 9/1999
JP 2003 019791 1/2003

* cited by examiner

*Primary Examiner*—Anh T. N. Vo

(57) ABSTRACT

In one embodiment, a filter element carrier comprises a first wedge shaped cavity, a second wedge shaped cavity isolated from and overlapping the first cavity, an outlet from a deep part of the first cavity, and an inlet to a deep part of the second cavity. In one embodiment, a filter element carrier comprises a body defining a cavity, the body having a first surface configured to support a first filter element covering one side of the cavity and a second surface configured to support a second filter element covering a second side of the cavity opposite the first side, and a barrier to fluid flow interposed between a first part of the cavity adjacent to the first surface and a second part of the cavity adjacent to the second surface.

11 Claims, 6 Drawing Sheets

FILTER ELEMENT CARRIER, FILTER, INK PEN

BACKGROUND

In many inkjet pens, the ink is filtered before reaching the ejection nozzles. A filter positioned between the ink supply and the ejection nozzles filters out particles that could slow or prevent the flow of ink to and through the nozzles. The demand for increased ink flow through the pen, and more specifically through the ink filter, increases along with the demand for faster printing. A problem is presented in increasing the flow of ink through the filter without also increasing the size of the inkjet pen to accommodate a larger filter, or increasing the pressure drop across the filter, or both.

DRAWINGS

Figure 4:
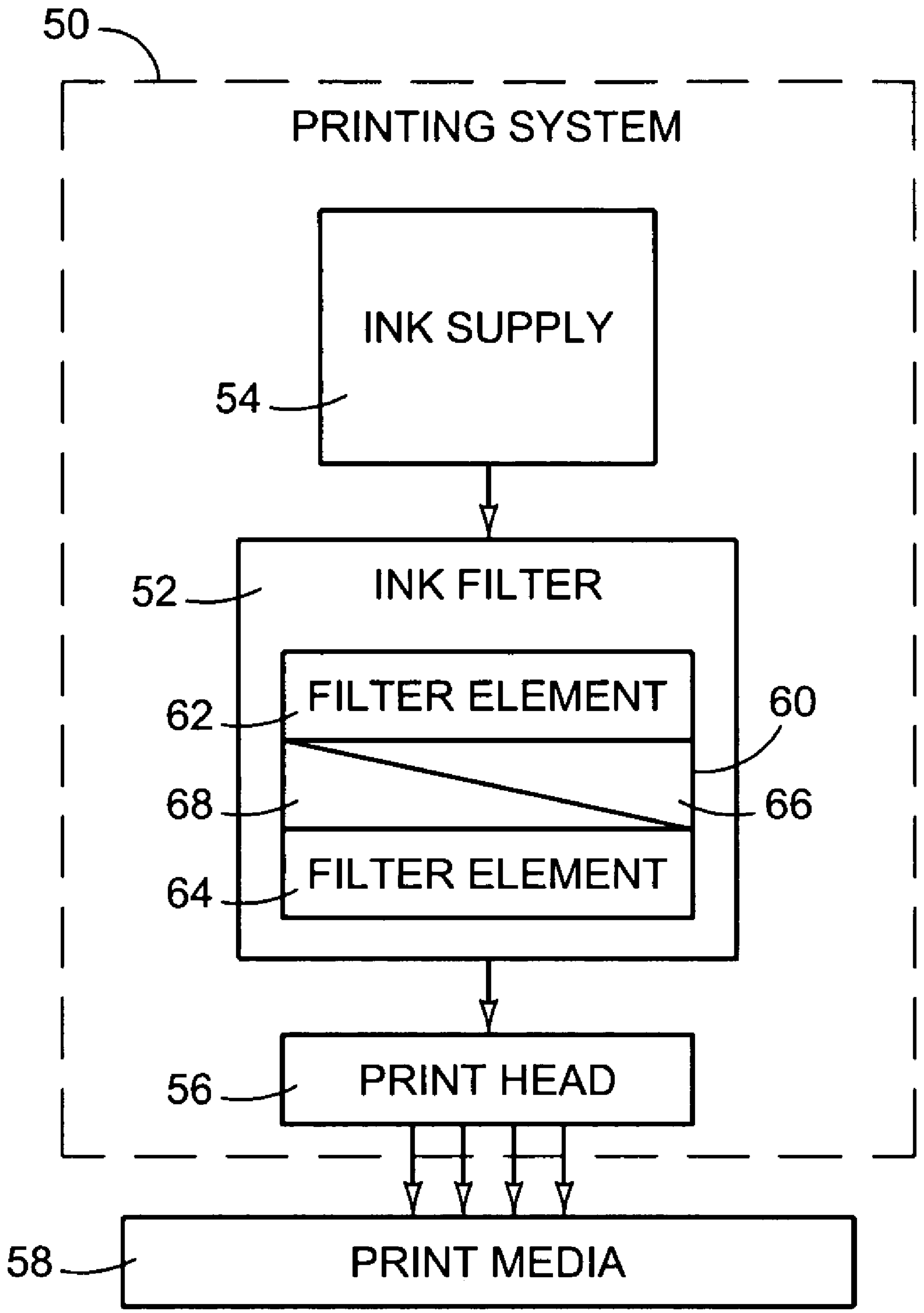

FIG. 4 a block diagram illustrating an ink supply, filter and print head according to one embodiment of the invention.

Figure 5:
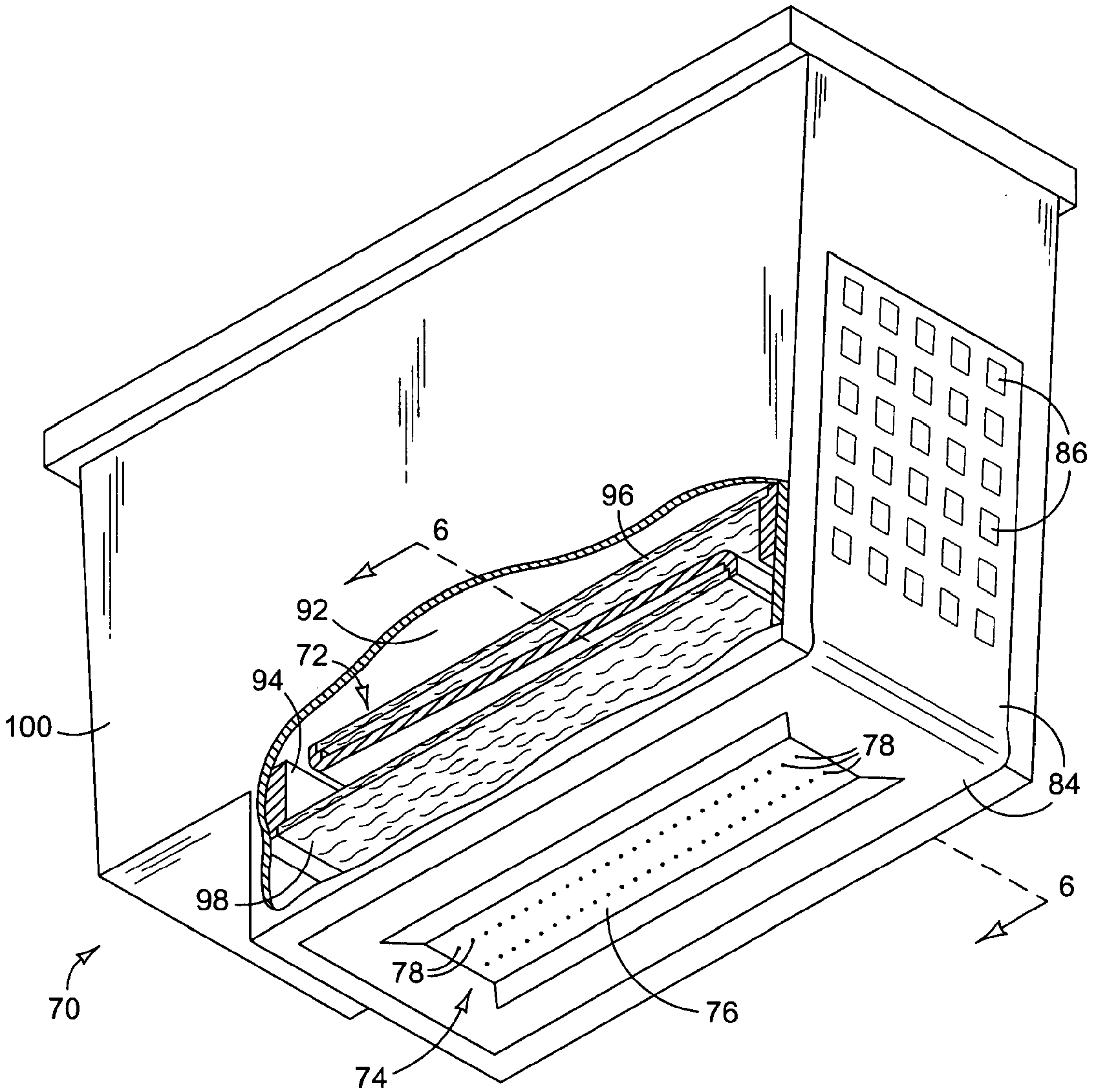

FIG. 5 is a perspective view of an ink pen according to one embodiment of the invention.

Figure 6:
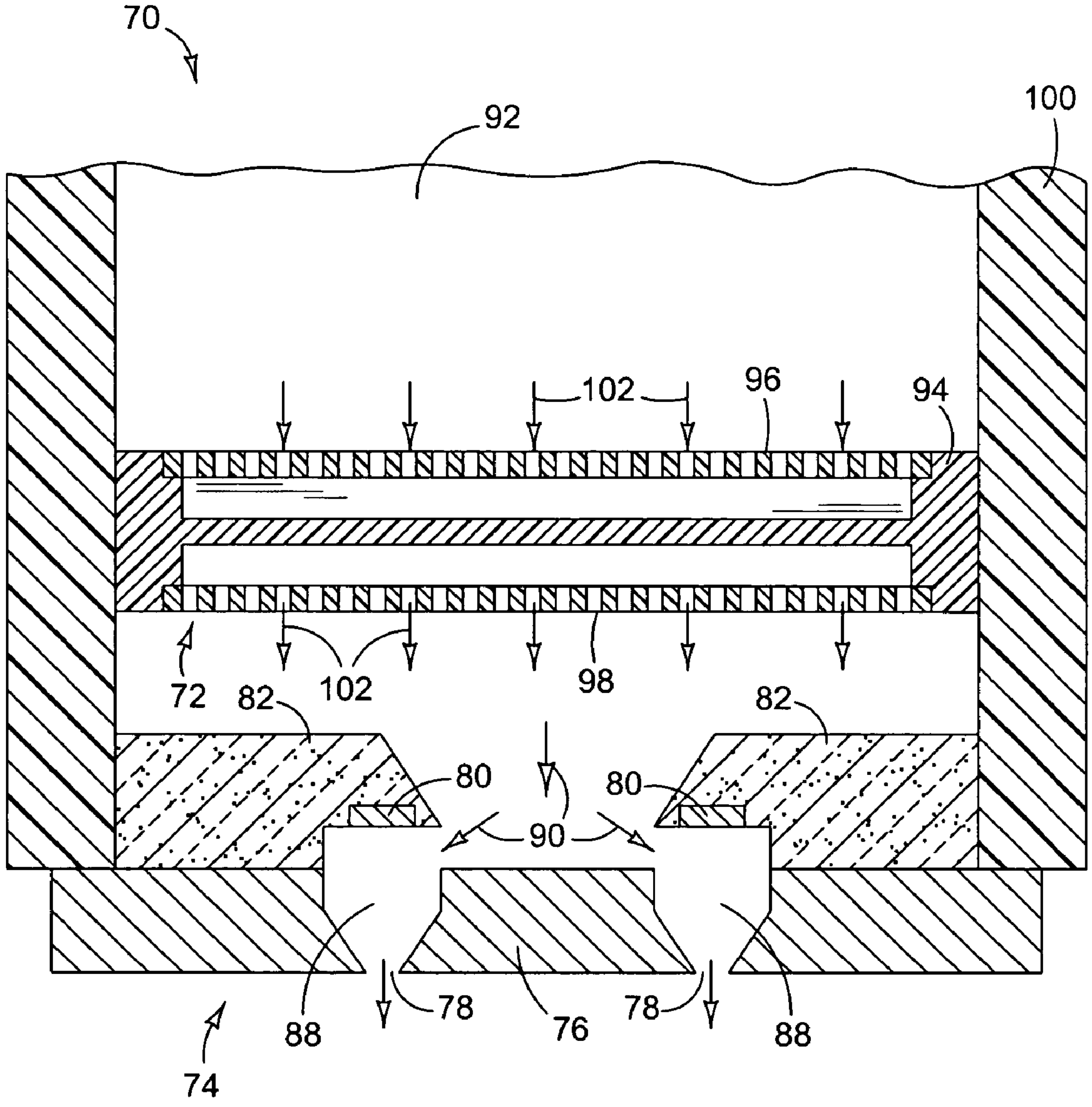

FIG. 6 is a section view of the ink pen shown in FIG. 5 taken along the line 6–6 in FIG. 5.

DESCRIPTION

Embodiments of the present invention were developed in an effort to provide an ink filter that can accommodate increased ink flow without also increasing pen size or increasing the pressure drop across the filter. Some embodiments of the invention, therefore, will be described with reference to inkjet printing and inkjet pens. Embodiments of the invention, however, are not limited to use in inkjet printing, inkjet pens or with ink. Rather, embodiments of the invention may be used in any application or environment which might benefit from such a filter or filter carrier. The exemplary embodiments shown in the figures and described below illustrate but do not limit the invention. Other forms, details, and embodiments may be made and implemented. Hence, the following description should not be construed to limit the scope of the invention, which is defined in the claims that follow the description.

Figure 1:
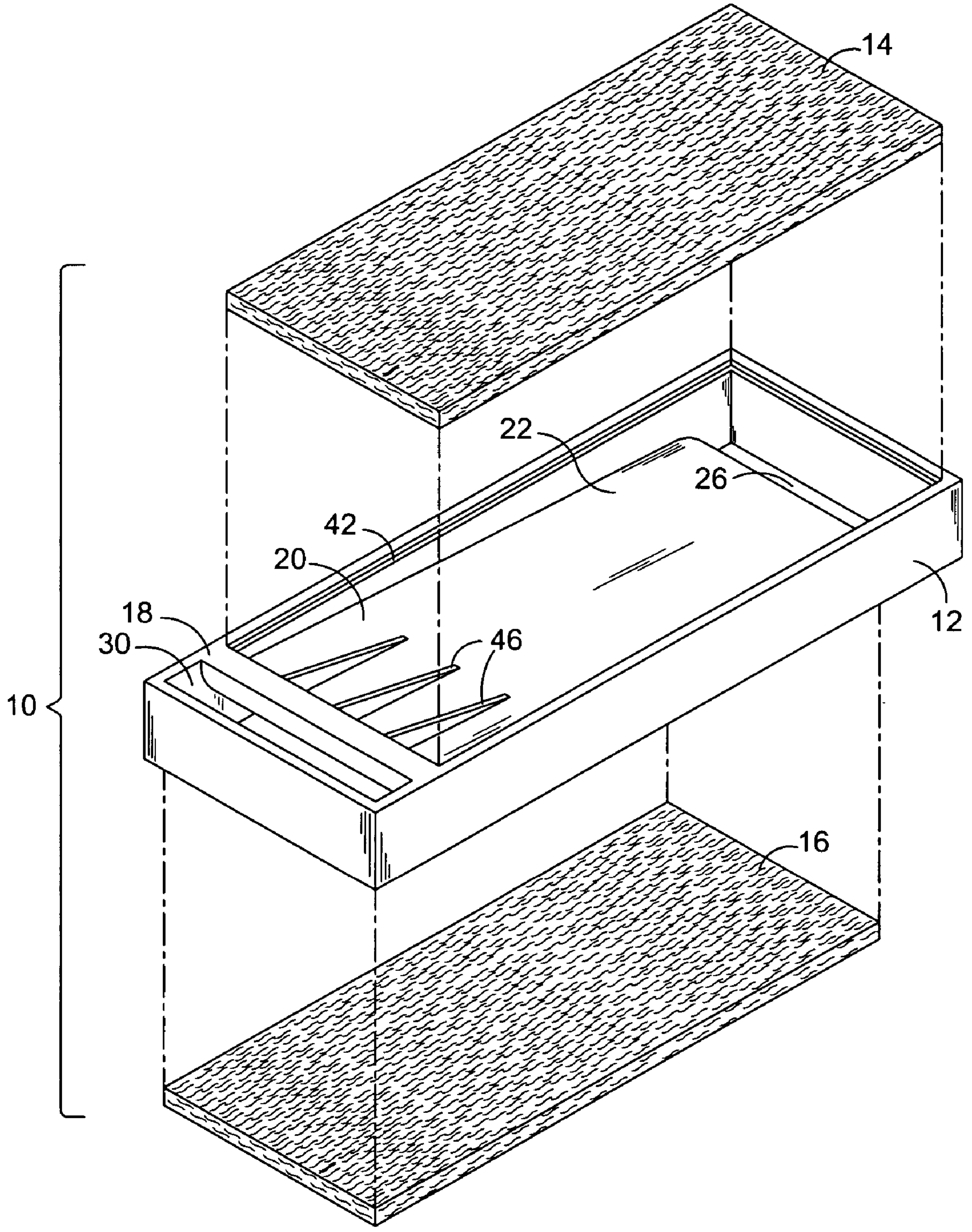
FIG. 1 is an exploded perspective view of an ink filter according to one embodiment of the invention.
Figure 2:
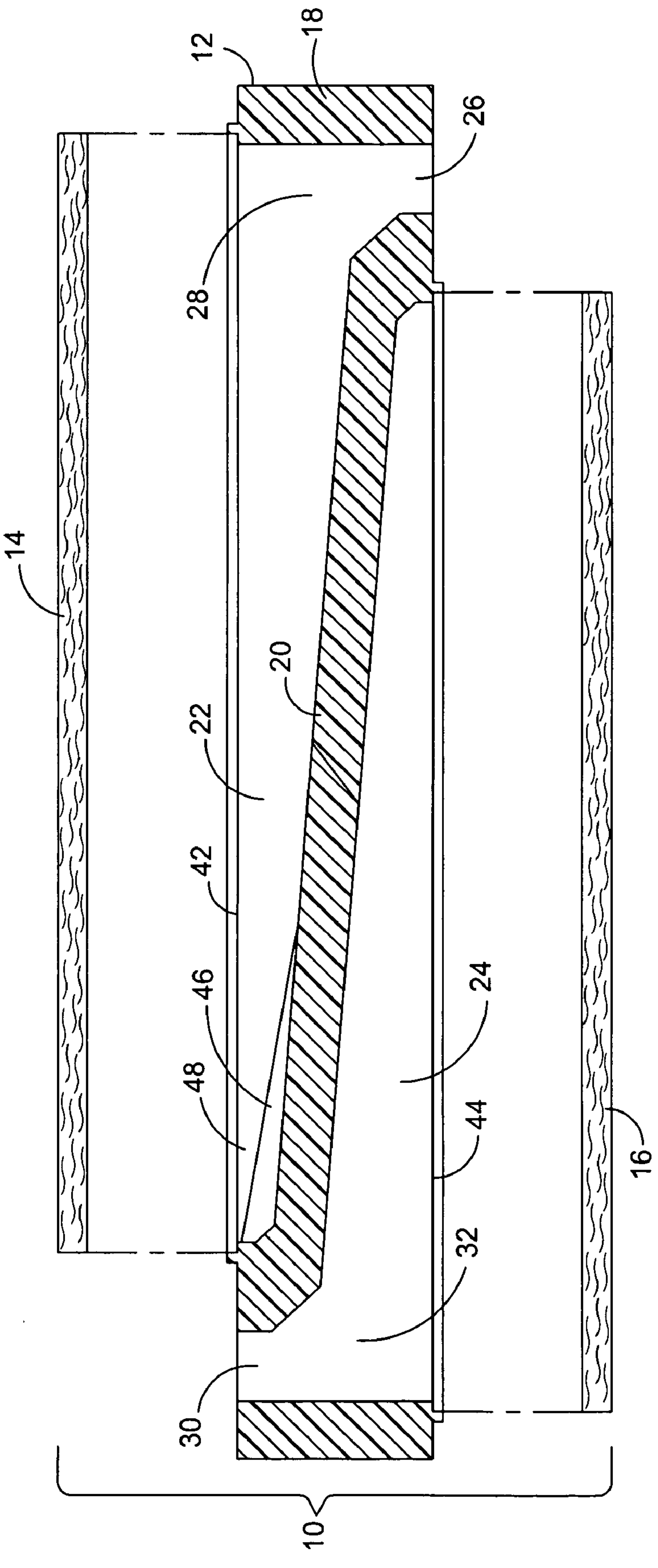
FIG. 2 is an exploded section view of the filter shown in FIG. 1.
Figure 3:
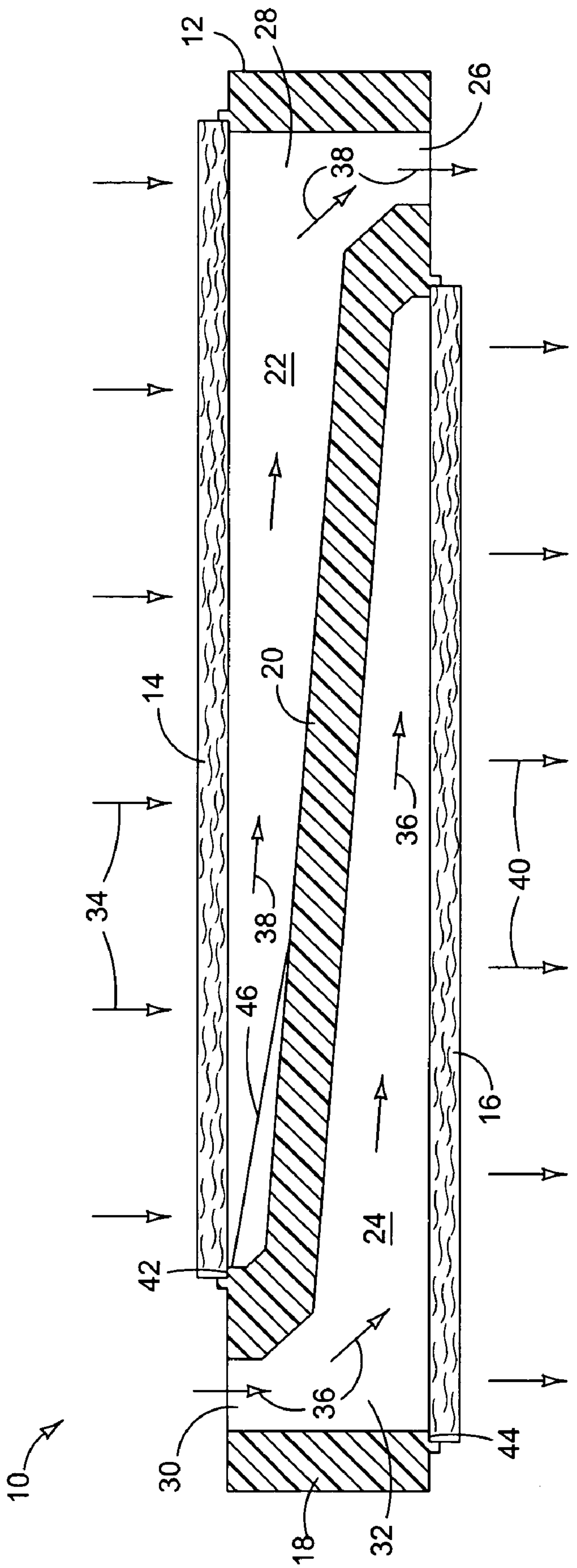
FIG. 3 is a section view of the filter shown in FIG. 1.

Referring to FIGS. 1–3, a filter 10 includes a carrier 12 and filter elements 14 and 16. Carrier 12 consists of a rectangular body 18 and a divider 20 that define two wedge shaped cavities 22 and 24. Divider 20 is impervious to the ink or other fluid with which filter 10 is used and, therefore, is a barrier to fluid flow between the two cavities 22 and 24. Fluid enters upper cavity 22 through filter element 14. Fluid leaves upper cavity 22 through an outlet 26 at a deeper part 28 of cavity 22. Fluid enters lower cavity 24 through an inlet 30 at a deeper part 32 of cavity 24. Fluid leaves lower cavity 24 through filter element 16. Divider 20 slopes down toward outlet 26 in upper cavity 22 and down away from inlet 30 in lower cavity 24.

Fluid flow through filter 10 is illustrated in FIG. 3. Referring to FIG. 3, fluid flows into upper cavity 22 through upper filter element 14, as indicated by arrows 34, and into lower cavity 24 through inlet 30, as indicated by arrows 36. Fluid flows out of upper cavity 22 through outlet 26, as indicated by arrows 38, and out of lower cavity 24 through filter element 16, as indicated by arrows 40. The flow characteristics of filter 10 may be improved by matching the flow capacity of filter elements 14, 16 with the flow capacity of outlet 26 and inlet 30, respectively.

The dual flow, dual element filter 10 shown in FIGS. 1–3 allows for nearly double the flow of fluid through the filter compared to a single flow, single element filter covering the same perimeter area. The increased flow may be realized with little or no increase in pressure drop across the filter 10 because fluid flows independently through each filter element 14, 16. Alternatively, the increased filtration area presented by filter 10 over a single flow filter allows for the use of tighter pore size filter elements to remove smaller contaminants without significantly reducing flow capacity compared to a single flow filter.

Referring again to FIGS. 1–3, filter element 14 is supported along its perimeter by an upper surface 42 of carrier body 18. Filter element 16 is supported along its perimeter by a lower surface 44 of carrier body 18. Surfaces 42, 44 are recessed, as best seen in FIGS. 2 and 3, or otherwise configured to support filter elements 14, 16. Any suitable filter media may be used in elements 14 and 16. For example, a polymeric filter element heat staked to a molded plastic carrier body 18 might be used in an inkjet pen. Sloped baffles 46 positioned at a shallow part 48 of upper cavity 22 may be used to help channel fluid down along divider 20. Baffles 46 may be desirable to enhance fluid flow for filter applications in which the gap between filter element 14 and divider 20 is very small.

FIG. 4 is a block diagram illustrating an inkjet printing system 50 that utilizes a dual flow, dual element filter 52 such as, for example, the filter shown in FIGS. 1–3. Printing system 50 includes filter 52, an ink supply 54 and a print head 56. Ink filter 52 is interposed between ink supply 54 and print head 56 so that ink cannot reach print head 56 without first passing through filter 52. Ink is ejected from print head 56 on to paper or other print media 58. Printing system 50 represents generally any inkjet printer or plotter. For example, the components of printing system 50 might be housed together as a single unit physically close to one another, as in a small format inkjet printer, or the components of printing system 50 might be housed in separate units more physically remote from one another, as in a large format inkjet plotter.

Ink filter 52 includes a carrier 60 carrying a first filter element 62 and a second filter element 64. Carrier 60 is configured to allow ink to flow independently from ink supply 54 through filter elements 62 and 64 to print head 56 utilizing two overlapping but isolated flow chambers 66, 68, such as, for example, upper and lower cavities 22 and 24 in the filter 10 shown in FIGS. 1–3. First flow chamber 66 is positioned downstream from first filter element 62 so that ink must flow through filter element 62 to reach chamber 66 and then on to print head 56. Second chamber 68 is positioned upstream from second filter element 64 so that ink must flow through chamber 68 to reach filter element 64 and then on to print head 56.

FIGS. 5 and 6 illustrate an ink pen 70 for a thermal inkjet printer. An ink pen is also commonly referred to as an ink cartridge or a print cartridge. FIG. 5 is a perspective view of ink pen 70. FIG. 6 is a section view of ink pen 70 taken along the line 6—6 in FIG. 5. The relative scale and dimensions of some of the features of pen 70 shown in FIGS. 5 and 6 have been greatly adjusted and some conventional features well known to those skilled in the art of inkjet printing have been omitted for clarity. Referring to FIGS. 5 and 6, ink pen 70 includes a dual flow, dual element filter 72 such as, for example, the filter shown in FIGS. 1–3. A print head 74 is located at the bottom of pen 70 below filter 72. Print head 74 includes an orifice plate 76 with ink ejection orifices 78 and firing resistors 80 formed on an integrated circuit chip 82 positioned behind ink ejection orifices 78. A flexible circuit 84 carries electrical traces from external contact pads 86 to firing resistors 80.

When ink pen 70 is installed in a printer, pen 70 is electrically connected to the printer controller through contact pads 86. In operation, the printer controller selectively energizes firing resistors 80 through the signal traces in flexible circuit 84. When a firing resistor 80 is energized, ink in a vaporization chamber 88 next to a resistor 80 is vaporized, ejecting a droplet of ink through orifice 78 on to the print media. Vaporization chamber 88 then refills with ink in preparation for the next ejection. The flow of ink through print head 74 is illustrated by arrows 90 in FIG. 6.

In ink pen 70, ink is supplied to print head 74 from a reservoir 92 located in the top of pen 70. Filter 72 is interposed between ink reservoir 92 and print head 74. Filter 72 includes a carrier 94 like carrier 12 shown in FIGS. 1–3. Carrier 94 is fitted with ink filtering elements 96 and 98. An interference fit or other conforming attachment is made between filter carrier 94 and pen body 100 to retain filter 72 in pen 70 to seal off ink flow between reservoir 92 and print head 74, except through filter 72. The flow of ink from reservoir 92 through filter 72 toward print head 74 is indicated by arrows 102 in FIG. 6.

As noted at the beginning of this Description, the exemplary embodiments shown in the figures and described above illustrate but do not limit the invention. Other forms, details, and embodiments may be made and implemented. Therefore, the foregoing description should not be construed to limit the scope of the invention, which is defined in the following claims.

What is claimed is:

1. A filter element carrier, comprising:

a first wedge shaped cavity;

a second wedge shaped cavity isolated from the first wedge shaped cavity such that fluid cannot flow between the first wedge shaped cavity and the second wedge shaped cavity and the second wedge shaped cavity overlapping the first wedge shaped cavity;

an outlet from a deep part of the first wedge shaped cavity; and an inlet to a deep part of the second wedge shaped cavity.

2. A filter element carrier, comprising:

a body defining a cavity, the body having a first surface and a second surface, a first part of the first surface configured to support a first filter element covering one side of the cavity and a first part of the second surface configured to support a second filter element covering a second side of the cavity opposite the first side;

a sloping barrier to fluid flow interposed between a first part of the cavity adjacent to the first surface and a second part of the cavity adjacent to the second surface; and the body further defining a first opening into the first part of the cavity through a second part of the second surface adjacent to a low end of the barrier and a second opening into the second part of the cavity through a second part of the first surface adjacent to a high end of the barrier.

3. A filter, comprising:

a first filter element covering a first filter chamber located downstream from the first filter element;

a second filter element covering a second filter chamber located upstream from the second filter element, the second filter chamber being isolated from the first filter chamber such that fluid cannot flow between the first filter chamber and the second filter chamber and the second filter chamber overlapping the first filter chamber; and an outlet from the first filter chamber, the first filter chamber configured to allow fluid entering the first filter chamber through the filter to leave the first filter chamber through the outlet: and an inlet to the second filter chamber, the second filter chamber configured to allow fluid entering the second filter chamber through the inlet to leave the second filter chamber through the filter.

4. A filter, comprising:

a carrier having a first wedge shaped cavity, a second wedge shaped cavity isolated from and overlapping the first wedge shaped cavity, an outlet from a deep part of the first wedge shaped cavity, and an inlet to a deep part of the second wedge shaped cavity;

a first filter element carried by the carrier, the first filter element covering the first wedge shaped cavity; and a second filter element carried by the carrier, the second filter element covering the second wedge shaped cavity.

5. A filter, comprising:

a body defining a cavity, the body having a first surface on one side of the cavity and a second surface on an opposing side of the cavity:

a first filter element supported on a first part of the first surface, the first filter element covering one side of the cavity:

a second filter element supported on a first part of the second surface, the second filter element covering the other side of the cavity:

a barrier to fluid flow between a first part of the cavity adjacent to the first filter element and a second part of the cavity adjacent to the second filter element, the barrier preventing fluid flow between the first part of the cavity and the second part of the cavity; and wherein the barrier comprises a sloping barrier and the body further defines a first opening into the first part of the cavity through a second part of the second surface and a second opening into the second part of the cavity through a second part of the first surface, the first opening adjacent to the second filter element near a low end of the barrier and the second opening adjacent to the first filter element near a high end of the barrier.

6. An ink printing system, comprising:

an ink supply;

a print head operatively connected to the ink supply through an ink filter; and the ink filter comprising a first filter element covering a first filter chamber located downstream from the first filter element and a second filter element covering a second filter chamber located upstream from the second filter element, the second filter chamber being isolated from the first filter chamber such that fluid cannot flow between the first filter chamber and the second filter chamber and the second filter chamber overlapping the first filter chamber.

7. The system of claim 6, further comprising an outlet from the first filter chamber to the print head and an inlet from the ink supply to the second filter chamber.

8. An ink printing system, comprising:

an ink supply;

a print head operatively connected to the ink supply; and an ink filter between the ink supply and the print head, the ink filter comprising a carrier having a first wedge shaped cavity, a second wedge shaped cavity isolated from and overlapping the first wedge shaped cavity, an outlet from a deep part of the first wedge shaped cavity, and an inlet to a deep part of the second wedge shaped cavity, a first filter element carried by the carrier, the first filter element covering the first wedge shaped cavity, and a second filter element carried by the carrier, the second filter element covering the second wedge shaped cavity.

9. An inkjet printing pen, comprising:

a pen body defining an interior reservoir for storing ink;

a print head operatively connected to the reservoir through an ink filter; and the ink filter comprising a first filter element covering a first filter chamber located downstream from the first filter and a second filter element covering a second filter chamber located upstream from the second filter element, the second filter chamber being isolated from the first filter chamber such that fluid cannot flow between the first filter chamber and the second filter chamber and the second filter chamber overlapping the first filter chamber.

10. The pen of claim 9, further comprising an outlet from the first filter chamber to the print head and an inlet from the reservoir to the second filter chamber.

11. An inkjet printing pen, comprising:

a pen body defining an interior reservoir for storing ink;

a print head operatively connected to the reservoir through an ink filter; and the ink filter comprising a carrier having a first wedge shaped cavity, a second wedge shaped cavity isolated from and overlapping the first wedge shaped cavity, an outlet from a deep part of the first wedge shaped cavity, and an inlet to a deep part of the second wedge shaped cavity, a first filter element carried by the carrier, the first filter element covering the first wedge shaped cavity, and a second filter element carried by the carrier, the second filter element covering the second wedge shaped cavity.

* * * * *

UNITED STATES PATENT AND TRADEMARK OFFICE

CERTIFICATE OF CORRECTION

PATENT NO. : 7,192,131 B2 
APPLICATION NO. : 10/843913
DATED : March 20, 2007
INVENTOR(S) : Jinsong Gao et al.

It is certified that error appears in the above-identified patent and that said Letters Patent is hereby corrected as shown below:

In column 4, line 14, in Claim 3, after “outlet” delete “:” and insert -- ; --, therefor.

In column 4, line 32, in Claim 5, after “cavity” delete “:” and insert -- ; --, therefor.

In column 4, line 35, in Claim 5, after “cavity” delete “:” and insert -- ; --, therefor.

In column 4, line 38, in Claim 5, after “cavity” delete “:” and insert -- ; --, therefor.

Signed and Sealed this

Second Day of December, 2008

JON W. DUDAS

*Director of the United States Patent and Trademark Office*